US010464744B2

(12) United States Patent
Loewen et al.

(10) Patent No.: US 10,464,744 B2
(45) Date of Patent: Nov. 5, 2019

(54) ENTRAINMENT-REDUCING ASSEMBLY, SYSTEM INCLUDING THE ASSEMBLY, AND METHOD OF REDUCING ENTRAINMENT OF GASES WITH THE ASSEMBLY

(71) Applicant: GE-Hitachi Nuclear Energy Americas LLC, Wilmington, NC (US)

(72) Inventors: Eric Paul Loewen, Wilmington, NC (US); Brian Scott Triplett, Wilmington, NC (US); Brett Jameson Dooies, Wilmington, NC (US); Jordan E. Hagaman, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 15/681,856

(22) Filed: Aug. 21, 2017

(65) Prior Publication Data
US 2017/0369239 A1 Dec. 28, 2017

Related U.S. Application Data

(62) Division of application No. 13/721,346, filed on Dec. 20, 2012, now Pat. No. 9,738,440.

(51) Int. Cl.
*B65D 90/22* (2006.01)
*G21C 9/012* (2006.01)
(Continued)

(52) U.S. Cl.
CPC ............. *B65D 90/22* (2013.01); *G21C 9/012* (2013.01); *B01D 29/01* (2013.01); *G21C 15/18* (2013.01); *Y02E 30/40* (2013.01)

(58) Field of Classification Search
CPC ........ Y02E 30/40; B65D 90/22; G21C 9/012; G21C 15/18; B01D 2201/313
See application file for complete search history.

(56) References Cited

U.S. PATENT DOCUMENTS 2,917,926 A 12/1959 Jaquith
3,041,264 A 6/1962 Pierre-Jean
(Continued)

FOREIGN PATENT DOCUMENTS

CA 2136374 A1 5/1996
EP 2518731 A2 10/2012
(Continued)

OTHER PUBLICATIONS

Translation of Kawabata et al. JP2002168985 published Jun. 14, 2002 as translated by Phoenix Translations (Year: 2002).*
(Continued)

*Primary Examiner* — Stephen Hobson
(74) *Attorney, Agent, or Firm* — Harness, Dickey & Pierce, P.L.C.

(57) ABSTRACT

An entrainment-reducing assembly may include a container configured to hold a liquid. A venting arrangement may extend into an upper portion of the container and be configured to direct condensable and non-condensable gases into the container. A suction structure may extend into a lower portion of the container and be configured to carry out an extraction of excess liquid from the container caused by condensed gases. A deflector may be disposed between the suction structure and the venting arrangement within the container. As a result, an entrainment of uncondensed gases during the extraction of the liquid by the suction structure may be reduced or prevented, thereby protecting the pump from cavitation and failure.

7 Claims, 8 Drawing Sheets

(51) Int. Cl.
  *B01D 29/01* (2006.01)
  *G21C 15/18* (2006.01)

(56) References Cited

U.S. PATENT DOCUMENTS

| | | | |
|---|---|---|---|
| 3,308,032 | A | 3/1967 | Berthod |
| 4,050,983 | A | 9/1977 | Kleimola |
| 4,057,464 | A | 11/1977 | Mair et al. |
| 4,210,614 | A | 7/1980 | Kleimola |
| 4,808,369 | A | 2/1989 | Yamanari et al. |
| 5,011,652 | A | 4/1991 | Tominaga et al. |
| 5,087,408 | A | 2/1992 | Tominaga et al. |
| 5,096,659 | A | 3/1992 | Hidaka et al. |
| 5,106,571 | A | 4/1992 | Wade et al. |
| 5,120,490 | A | 6/1992 | Koshiishi et al. |
| 5,211,906 | A | 5/1993 | Hatamiya et al. |
| 5,217,680 | A | 6/1993 | Koshiishi et al. |
| 5,282,230 | A | 1/1994 | Billig et al. |
| 5,301,215 | A | 4/1994 | Gou et al. |
| 5,345,482 | A | 9/1994 | Conway et al. |
| 5,479,461 | A | 12/1995 | Kilian |
| 5,491,730 | A | 2/1996 | Kataoka et al. |
| 5,825,838 | A | 10/1998 | Park et al. |
| 5,840,198 | A | 11/1998 | Clarke |
| 6,219,399 | B1 | 4/2001 | Naruse et al. |
| 2002/0122526 | A1 | 9/2002 | Hidaka et al. |
| 2006/0075697 | A1 | 4/2006 | Oates et al. |
| 2006/0219645 | A1 | 10/2006 | Bilanin et al. |
| 2010/0124303 | A1 | 5/2010 | Young et al. |
| 2010/0239061 | A1 | 9/2010 | Aoki et al. |
| 2011/0174159 | A1 | 7/2011 | Swantner et al. |
| 2012/0051487 | A1 | 3/2012 | Fukuda et al. |
| 2012/0294407 | A1* | 11/2012 | Namba ............ G21C 9/004 376/272 |
| 2014/0072090 | A1 | 3/2014 | Bass et al. |
| 2014/0112426 | A1 | 4/2014 | Ikegawa et al. |
| 2015/0221403 | A1 | 8/2015 | Kim et al. |

FOREIGN PATENT DOCUMENTS

| | | |
|---|---|---|
| EP | 2538415 A2 | 12/2012 |
| EP | 2657941 A2 | 10/2013 |
| EP | 2680272 A2 | 1/2014 |
| GB | 705548 A | 3/1954 |
| JP | 2002168985 * | 6/2002 |
| JP | 2002168985 A | 6/2002 |
| WO | WO-2010101112 A1 | 9/2010 |

OTHER PUBLICATIONS

PCT Search Report and Written Opinion dated Mar. 21, 2014 issued in connection with corresponding PCT Patent Application No. PCT/US2013/075051.

* cited by examiner

ENTRAINMENT-REDUCING ASSEMBLY, SYSTEM INCLUDING THE ASSEMBLY, AND METHOD OF REDUCING ENTRAINMENT OF GASES WITH THE ASSEMBLY

CROSS-REFERENCE TO RELATED APPLICATION

This application is a divisional under 35 U.S.C. § 121 of U.S. application Ser. No. 13/721,346, filed Dec. 20, 2012, the entire contents of which is incorporated herein by reference.

BACKGROUND

Field

The present disclosure relates to the reduction or prevention of the entrainment of gases into the suction of a pump during a loss of coolant accident (LOCA).

Description of Related Art

During a Loss of Coolant Accident (LOCA), the Emergency Core Cooling System (ECCS) must pump water to maintain the reactor core water level and to provide a cooling function to the reactor core. However, this same transient may cause gases to be forced downward into an operating Emergency Core Cooling System (ECCS) suction strainer, resulting in gas entrainment. In particular, during a Loss of Coolant Accident (LOCA), both condensable gases (e.g., steam) and non-condensable gases (e.g., nitrogen ($N_2$)) may be directed into a suppression pool, thereby elevating the level of the suppression pool. An Emergency Core Cooling System (ECCS) pump may be used to maintain the suppression pool at an acceptable level by suctioning excess liquid from the suppression pool and supplying the excess liquid to the reactor core. However, the non-condensable gases may become entrained along with the liquid into the suction of the Emergency Core Cooling System (ECCS) pump, thereby causing loss of suction and decreased flow to the reactor core. Furthermore, the presence of non-condensable gases within the Emergency Core Cooling System (ECCS) pump causes cavitation and pump damage, which poses additional safety hazards.

SUMMARY

The present disclosure describes various devices, assemblies, systems, and methods for preventing pumps (e.g., Emergency Core Cooling System (ECCS) pumps) from receiving relatively large quantities of entrained gas in the suction piping, which would cause cavitation and ultimately result in the failure of the pump. The teachings herein also promote the mitigation or prevention of non-condensable gases from reaching the suction strainers within the wetwell. Specially-designed deflector shields or baffles may be arranged between the drywell-to-wetwell vent downcomer and the Emergency Core Cooling System (ECCS) pump suction strainer. By preventing gases from the reaching the Emergency Core Cooling System (ECCS) suction water, the availability of pump operation for the duration of a postulated accident may be increased.

An entrainment-reducing assembly may include a container configured to hold a liquid. The container may include an upper portion and a lower portion. A venting arrangement may extend into the container. The venting arrangement may be configured to direct gases into the container. A suction structure may extend into the lower portion of the container. The suction structure may be configured to carry out an extraction of the liquid from the container. A deflector may be disposed between the suction structure and the venting arrangement within the container. The deflector may be configured to reduce the entrainment of uncondensed gases during the extraction of the liquid.

A reactor system may include a first container and a second container. The first container may define a drywell therein. The second container may define a wetwell therein. The second container may include an upper portion and a lower portion. A venting arrangement may connect the drywell to the wetwell. The venting arrangement may include a proximal end extending into the drywell and a distal end extending into the upper portion of the wetwell. A suction structure may extend into the lower portion of the wetwell. A deflector may be disposed between the suction structure and the distal end of the venting arrangement within the second container.

A method of reducing entrainment may include discharging gases from a venting arrangement into a liquid. The method may additionally include alleviating an elevated level of the liquid resulting from condensing gases by performing an extraction of the liquid with a suction structure. The method may further include shielding the suction structure from the entrainment of uncondensed gases in the liquid with a deflector during the extraction of the liquid.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
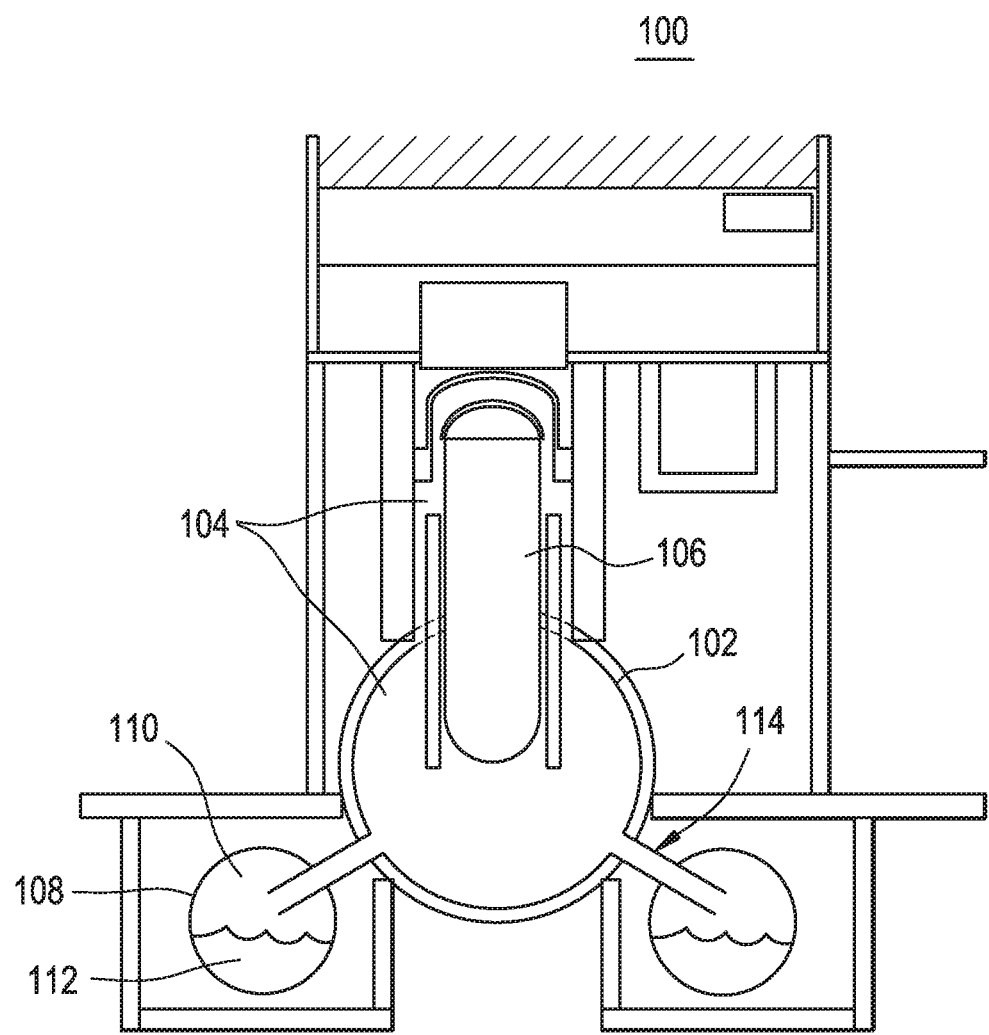
FIG. 1 is a simplified, cross-sectional view of a reactor system according to a non-limiting embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Various embodiments of the present disclosure relate to devices and assemblies, which when used inside a nuclear reactor (e.g., Boiling Water Reactor (BWR) Mark I or Mark II wetwells (torus)), will mitigate or solve the issue of "loss of suction" to Emergency Core Cooling System (ECCS) pumps due to the entrainment of steam and/or non-condensable gases during a Loss of Coolant Accident (LOCA) in the drywell. Various embodiments of the present disclosure also relate to systems and methods for reducing the entrainment of gases.

Although the description herein is in the context of a Boiling Water Reactor (BWR), it should be understood that example embodiments are not limited thereto. In addition to the various types of Boiling Water Reactors (BWR), the present disclosure may also be applied to Pressurized Water Reactor (PWR) emergency water sumps with suction strainers. Furthermore, the teachings herein may be applied to non-reactor settings. For instance, the devices, assemblies, systems, and methods may be used in other situations in which a suction is taken from a large reservoir of liquid (e.g., water), whereupon a large injection of non-condensable gases could result in these gases being entrained or swept into the suction pipe, thereby causing the downstream pump to fail.

FIG. 1 is a simplified, cross-sectional view of a reactor system according to a non-limiting embodiment. Referring to FIG. 1, a reactor system 100 includes a first container 102 defining a drywell 104 and a second container 108 defining a wetwell 110. A reactor pressure vessel 106 is situated within the drywell 104. A body of liquid 112 (e.g., suppression pool) is disposed within the wetwell 110. The drywell 104 is connected to the wetwell 110 via a venting arrangement 114. The details of FIG. 1 are discussed in connection with the subsequent drawings.

The present disclosure details the mitigation or prevention of gases from being entrained in the suction of Emergency Core Cooling System (ECCS) pumps. Such mitigation or prevention may improve the safety operation and availability of the Emergency Core Cooling System (ECCS) pumps during a Loss of Coolant Accident (LOCA). In particular, a relatively large Loss of Coolant Accident (LOCA) may force gas into the Emergency Core Cooling System (ECCS) piping. A relatively large gas entrainment may lead to gas entering an Emergency Core Cooling System (ECCS) pump, resulting in pump damage from cavitation and reduced flow (if any flow at all) to the reactor core. Consequently, the ability of the Emergency Core Cooling System (ECCS) pumps to maintain the proper water level in the reactor core may be affected. That being said, the present disclosure is directed to mitigating or preventing the possibility of gas reaching the suction of the Emergency Core Cooling System (ECCS) piping.

A centrifugal pump is used in the Emergency Core Cooling Systems (ECCS) of Boiling Water Reactors (BWR) and Pressurized Water Reactors (PWR). A centrifugal pump requires a net positive suction head (NPSH) at a given location relative to a reference point as defined by the following equation:

$$NPSH = \frac{P_o - P_v}{\rho g} + \Delta z - h_L \quad (1)$$

wherein $P_o$ is the pressure acting upon the fluid at the reference point, $P_v$ is the saturation pressure for the fluid at the current temperature, $\rho$ is the fluid density, g is gravitational acceleration, $\Delta z$ is the height difference from the current point to the reference point, and $h_L$ is the head loss between the two points.

If a centrifugal pump does not have a sufficient net positive suction head (NPSH), then low or no flow, pump wear, and in the worst case, seizing of the pump will result. During a Loss of Coolant Accident (LOCA), as will be explained, gases (e.g., non-condensable nitrogen, which was previously used to inert the drywell, and steam, resulting from the flashing flow from a design basis line break) can be forced through the suction strainer in the wetwell (e.g., torus-shaped wetwell) and then into the Emergency Core Cooling System (ECCS) suction header and finally into the pump.

Depending on the anticipated Emergency Core Cooling System (ECCS) configuration and potential active failures, the ranges of flow[1] in an Emergency Core Cooling System (ECCS) header range from 600 to 30,000 gal/min (5,010 to 417,000 lbs/min). With a ring header diameter of 2 feet, this results in a Reynolds number ranging from $10^5$ to $10^7$. Reynolds number[2]* is the ratio of inertial forces within a fluid to its vicious forces and is defined by the following equation:

$$Re = \frac{QD}{vA} \quad (2)$$

wherein Q is the Emergency Core Cooling System (ECCS) flow rate, D is the hydraulic diameter, v is the kinematic viscosity, and A is the cross-sectional area of the ring header.

[1]Assuming RCIC~600 gpm, HPCS (BWR/5 s and 6 s)~7,175 gpm, Low pressure systems that take SP suction: LPCI~4 pumps*8400 gpm/pump=33,600 gpm, LPCS~2 pumps*8400 gpm/pump=16,800 gpm.
[2]Assuming Viscosity at 100° F.=4.579E-4 $lb_m$/ft/s; Density at 100° F.=8.34 $lb_m$/gallon; Kinematic viscosity=4.579E-4/8.34*60=0.003294 gal/ft/min; D=2 ft; D/A=D/(¼ pi $D^2$)=4/(pi D)=0.6366 1/ft; Re=Q [gal/min]*193.2 min/gal.

Due to the relatively high Reynolds number, the flow regime is highly turbulent and the inertial force dominates over buoyant forces of gas entrained in the water. Therefore, to remove entrained gases from the water the Reynolds number needs to reach a value below 1000, so that buoyancy of the entrained gas can allow phase separation. Even at a Reynolds number of about 100, a wobble occurs that causes bubbles to rise in a spiral or helical path. This velocity of the fluid can occur with expansion of the flow area and is enhanced with flow direction changes. These entrained air bubbles in the pool will take much longer to rise to the surface because of the viscosity of the water. Air bubbles will rise and achieve a terminal velocity governed by Stoke's law.

Figure 2:
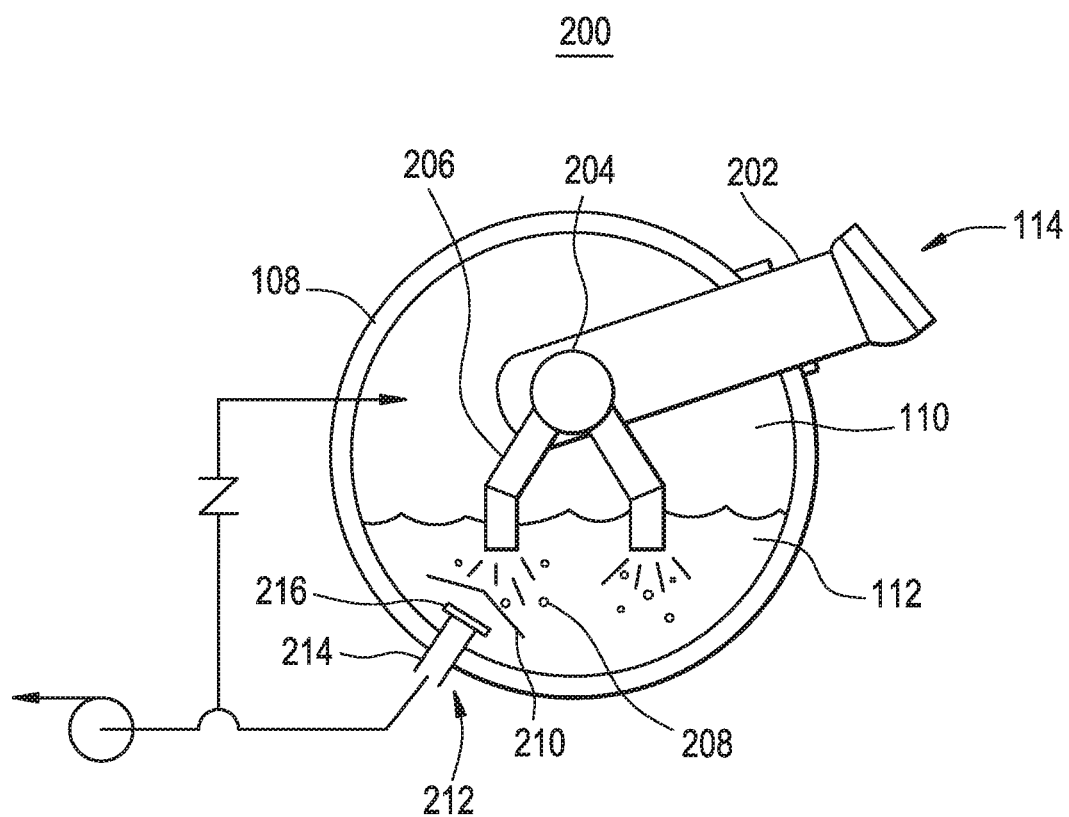
FIG. 2 is cross-sectional view of an entrainment-reducing assembly according to a non-limiting embodiment that may be used in the reactor system of FIG. 1.

FIG. 2 is cross-sectional view of an entrainment-reducing assembly according to a non-limiting embodiment that may be used in the reactor system of FIG. 1. Although the entrainment-reducing assembly of FIG. 2 is shown in connection with a Boiling Water Reactor (BWR) Mark I suppression pool, it should be understood that example embodiment are not limited thereto. Referring to FIG. 2, the entrainment-reducing assembly 200 includes the second container 108, which defines the wetwell 110 and holds the body of liquid 112 (e.g., suppression pool of water) therein. The venting arrangement 114 connects the drywell 104 (FIG. 1) to the wetwell 110. The venting arrangement 114 includes a vent pipe 202, a header 204, and a plurality of downcomers 206. A suction structure 212 protrudes into the second container 108 at a position below the surface of the liquid 112. The suction structure 212 includes a suction pipe 214 and a strainer 216 secured to the suction pipe 214. The strainer 216 may have a variety of configurations and shapes and is designed to allow the liquid 112 to enter with relative ease while filtering out relatively large-sized debris.

A deflector 210 is arranged between the suction structure 212 and the venting arrangement 114 to deflect uncondensed gas 208 away from the suction structure 212 so as to reduce or prevent the entrainment of the uncondensed gas 208 with the liquid 112. A spacing distance between the deflector 210 and the suction structure 212 may be equal to or less than half of a total distance between the venting arrangement 114 and the suction structure 212. The deflector 210 may be secured to the second container 108 such that the deflector 210 does not directly contact the suction structure 212. After passing through the strainer 216 and entering the suction pipe 214, the liquid 112 is directed through the suction line to a pump. Optionally, a gas/liquid separator may be additionally connected to the suction line to separate out any uncondensed gases that may have been entrained with the liquid 112. The gases may be separated based on density, and the separated gases may be redirected back into the wetwell 110.

The common term for a Mark I wetwell is a torus, since the second container 108 defining the wetwell 110 may be in the form of a torus. When the second container 108 is in a form of a torus, eight vent pipes 202 may connect the drywell 104 to the wetwell 110. In such an example, the header 204 may be in form of a ring within the torus that connects the vent pipes 202. In addition to the vent pipes 202, the gas flow from the drywell 104 is further divided by a plurality of downcomers 206 which discharge the gas below the surface of the liquid 112 (e.g., subcooled water). Steam quenchers may be optionally attached to the downcomers 206. The strainer 216 is positioned so as to remain submerged near the bottom of the second container 108. The liquid 112 is removed from the wetwell 110 via the suction structure 212 and is conveyed through the suction pipe 214 to the Emergency Core Cooling System (ECCS) pumps. The deflector 210 is positioned between the strainer 216 and the downcomer 206 to reduce or prevent the entrainment of an uncondensed gas 208 into the suction line. Although not shown in the drawings, it should be understood that a suction structure 212 and/or a deflector 210 may be provided for each downcomer 206.

The entrainment-reducing assembly 200 will be described in additional detail with regard the following three states:

normal operations "Steady State," a state after a "Large LOCA" in the drywell, and the resulting system transient "Gas to ECCS Pumps" state.

A "Steady State" assumes that the reactor is at normal operating temperature and pressure and assumed at 100% power. In such a state, the liquid 112 in the wetwell 110 is at a normal level.

During a "Large LOCA" state, there is a break at rated power, which involves an instantaneous rupture of a steam or recirculation line in the dry well 104. As a result of the rupture, a shock wave exits with a wave amplitude approaching the reactor operating pressure (e.g., 1000 psig). The attenuated wave enters the venting arrangement 114 and progresses into the wetwell 110. The high pressure gases (e.g., $N_2$ and steam) from the drywell 104 are forced downward through the venting arrangement 114. The high pressure gases exit the downcomer 206 and set off several phenomena, such as pool swell in the torus increasing from the steady state (normal) level to an elevated level, condensation oscillation as the steam chaotically condenses and pool water voids, and forcible downward direction of the gas mixture.

In a conventional system, if the Emergency Core Cooling System (ECCS) suction strainer is located in the vicinity of the downcomer nozzle, the gas jet can be forced into the suction strainer, thereby introducing a slug of gas into the Emergency Core Cooling System (ECCS) header. If the Emergency Core Cooling System (ECCS) pumps have already been activated, with water flow from the wetwell established, this slug of gas can move into the Emergency Core Cooling System (ECCS) pump, resulting in reduced pump flow, cavitation, and/or pump damage.

In contrast, in the present disclosure, a deflector 210 is in place as the gas jet is forced towards the strainer 216. As a result, the deflector 210 deflects the gas flow, thereby allowing for buoyancy effects to permit the gas to separate and rise to the headspace of the wetwell 110. The strainer 216 under the deflector 210 still maintains suction of the liquid 112 from the wetwell 110. Additionally, as schematically shown in FIG. 2, gas/liquid separator may be used to remove gas that may have become entrained with the liquid 112 into the Emergency Core Cooling System (ECCS) suction line. The gas that is removed from the suction line may be put back into the headspace of the wetwell 110.

Figure 3:
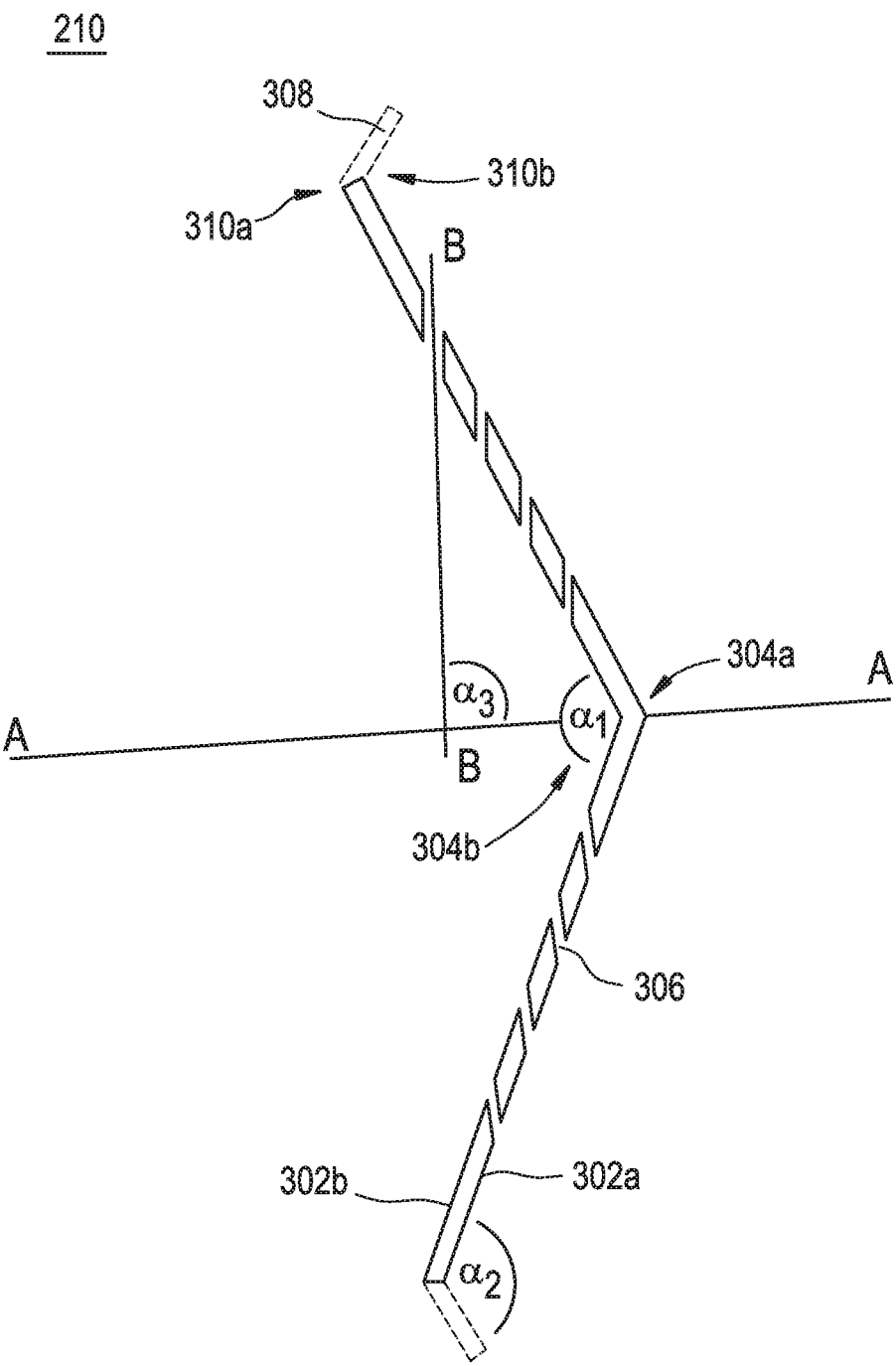
FIG. 3 is a cross-sectional view of a deflector according to a non-limiting embodiment that may be used in the entrainment-reducing assembly of FIG. 2.

FIG. 3 is a cross-sectional view of a deflector according to a non-limiting embodiment that may be used in the entrainment-reducing assembly of FIG. 2. Referring to FIG. 3, the deflector 210 may include a first surface 302a with a first ridge 304a and a second surface 302b with a first furrow 304b. When installed in the entrainment-reducing assembly 200, the first furrow 304b will face the strainer 216, while the first ridge 304a will face the downcomer 206. A first angle $\alpha_1$ of the first furrow 304b, as defined by the second surface 302b, should be of a magnitude that is sufficient to cause the uncondensed gas 208 of the impinged two phase jet hitting the deflector 210 to be deflected upward towards the surface of the wetwell liquid 112 to inhibit or prevent the uncondensed gas 208 from entering the strainer 216 and to allow for a separation when the uncondensed gas 208 reaches the headspace of the wetwell 110. In a non-limiting embodiment, the first angle $\alpha_1$ may range from about 155° to 170°.

The deflector 210 may optionally have a periphery 308 that slopes away from the suction structure 212 so as to form a second ridge 310a and a second furrow 310b, wherein the periphery 308 enhances the deflection of the uncondensed gas 208 away from the suction structure 212. A second angle $\alpha_2$ of the second furrow 310b may range from 155° to 180°. Although not shown, it should be understood that the second ridge 310a and/or the second furrow 310b may be curved instead of being angular.

The deflector 210 may also include a plurality of perforations 306 extending from the first surface 302a to the second surface 302b. The plurality of perforations 306 allow the liquid 112 to flow through the deflector 210, thereby reducing the differential force across the deflector 210 and allowing the liquid 112 to enter the strainer 216. The plurality of perforations 306 may be angled inward toward the suction structure 212 and/or the first furrow 304b so as to allow entry of the liquid 112 while deflecting the uncondensed gas 208 away from the suction structure 212. In FIG. 3, assuming that A-A is a center line that bisects the deflector 210 and B-B is a line that corresponds to a longitudinal axis of the perforation 306 and intersects A-A to form a third angle $\alpha_3$, the third angle $\alpha_3$ may range from about 45° to 135° (e.g., 60° to 90°).

The diameter of each of the plurality of perforations 306 may be sized to be about two times the average expected bubble size of the uncondensed gas 208 impinging on the deflector 210. As noted above, the plurality of perforations 306 are at a third angle $\alpha_3$ that reduces or prevents bubble entrainment as the two phase jet impinges on the first surface 302a. The amount of uncondensed gas 208 entrained through the plurality of perforations 306 is a function of perforation diameter, perforation length, and the water flow rate. A method to optimize the diameter of the perforations 306 use the Froude number (Fr):

$$Fr = V_L \bigg/ \sqrt{g\left(\frac{(\rho_l - \rho_G)}{\rho_l}\right)D} \quad (3)$$

wherein $V_L$ is the liquid velocity in the perforations, g is the acceleration due to gravity, $\rho_l$ is the density of the liquid, $\rho_G$ is the density of the gas, and D is the inside diameter of the perforations. The Froude number (Fr) should be a value that gives the uncondensed gas 208 an adequate opportunity to be deflected and rise toward the headspace of the wetwell 110. In a non-limiting embodiment, Fr<0.31. Although the perforations 306 have been discussed in the context of a circular hole, it should be understood that example embodiments are not limited thereto. For instance, the perforations 306 may be in the form of other curved shapes or polygonal shapes (e.g., slits)

Figure 4A:
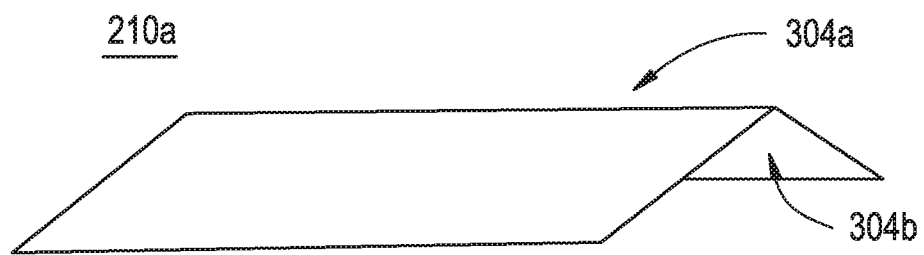
FIG. 4A is a perspective view of another deflector according to a non-limiting embodiment that may be used in the entrainment-reducing assembly of FIG. 2.
Figure 4B:
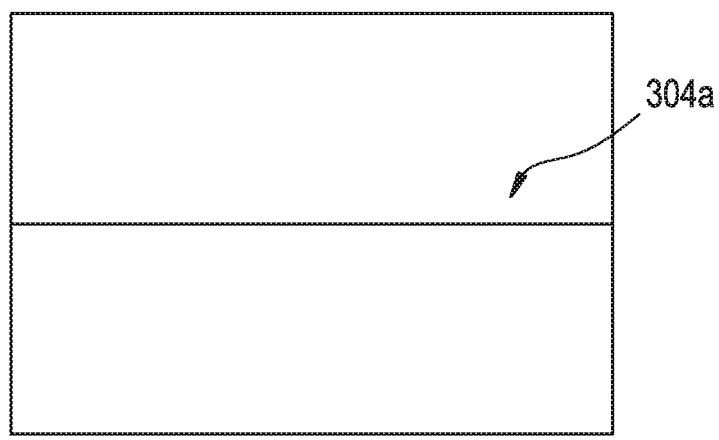
FIG. 4B is a plan view of the deflector of FIG. 4A.

FIG. 4A is a perspective view of another deflector according to a non-limiting embodiment that may be used in the entrainment-reducing assembly of FIG. 2. FIG. 4B is a plan view of the deflector of FIG. 4A. Referring to FIGS. 4A-4B, the deflector 210 is in the form of a bent sheet 210a including a first ridge 304a and a first furrow 304b. Although not shown, it should be understood that one or more of the features discussed in connection with FIG. 3 may be applied to this example.

Figure 5A:
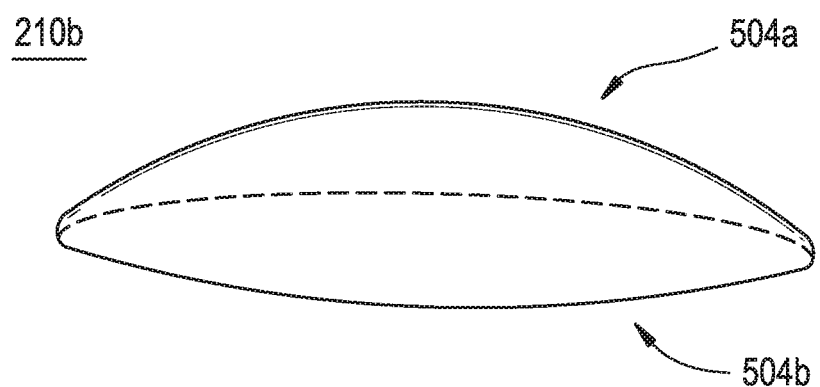
FIG. 5A is a perspective view of another deflector according to a non-limiting embodiment that may be used in the entrainment-reducing assembly of FIG. 2.
Figure 5B:
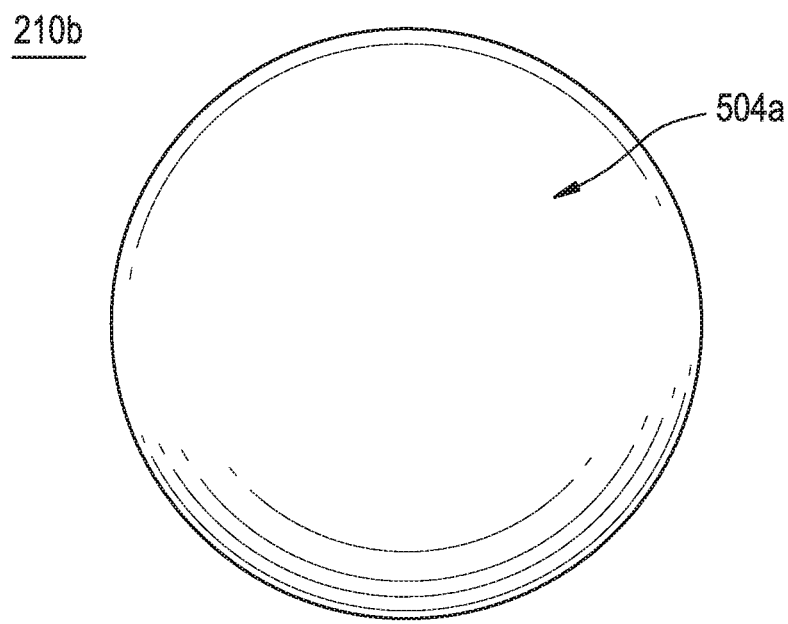
FIG. 5B is a plan view of the deflector of FIG. 5A.

FIG. 5A is a perspective view of another deflector according to a non-limiting embodiment that may be used in the entrainment-reducing assembly of FIG. 2. FIG. 5B is a plan view of the deflector of FIG. 5A. Referring to FIGS. 5A-5B, the deflector 210 is in the form of a curved shield 210b including a convex side 504a and a concave side 504b. Although not shown, it should be understood that one or more of the features discussed in connection with FIG. 3 may be applied to this example.

Figure 6A:
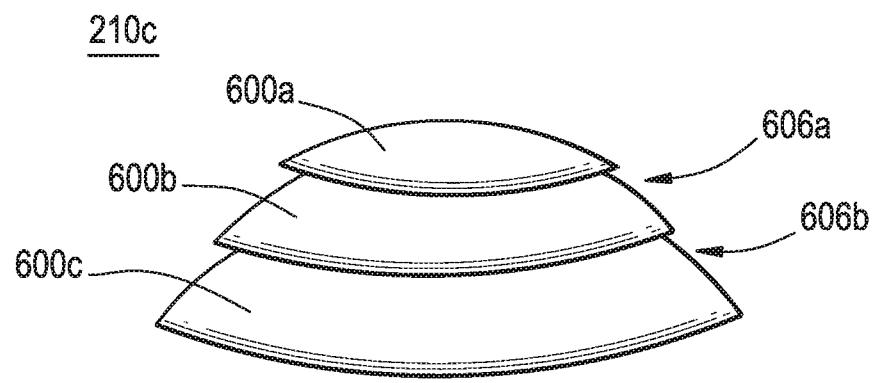
FIG. 6A is a perspective view of another deflector according to a non-limiting embodiment that may be used in the entrainment-reducing assembly of FIG. 2.
Figure 6B:
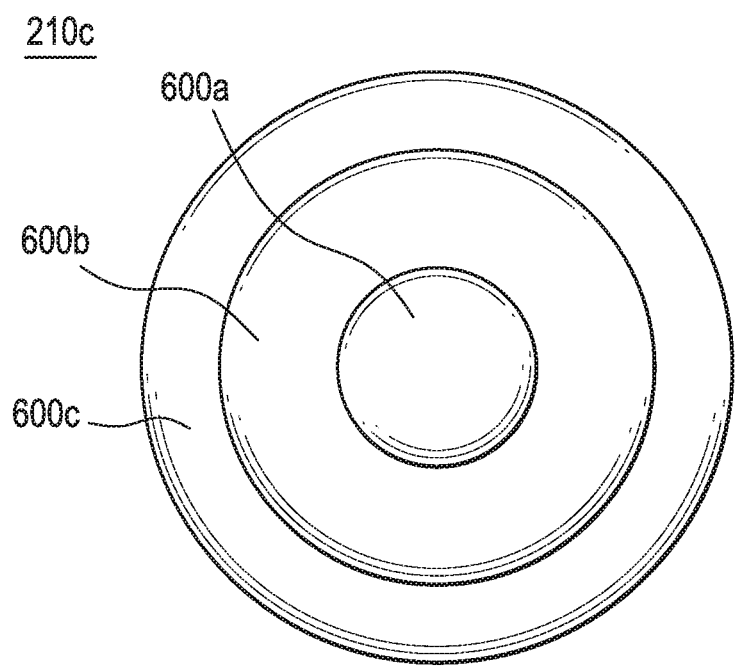
FIG. 6B is a plan view of the deflector of FIG. 6A.

FIG. 6A is a perspective view of another deflector according to a non-limiting embodiment that may be used in the entrainment-reducing assembly of FIG. 2. FIG. 6B is a plan view of the deflector of FIG. 6A. Referring to FIGS. 6A-6B, the deflector 210 is in the form of a curved-type louvered arrangement 210c including a first curved portion 600a, a second curved portion 600b, and a third curved portion 600c. The second curved portion 600b and a third curved portion 600c are provided with an opening in the center thereof such that when arranged with the first curved portion 600a into an overlapping louvered arrangement, the first curved portion 600a and the second curved portion 600b define a first passage 606a therebetween, while the second curved portion 600b and the third curved portion 600c define a second passage 606b therebetween. Although not shown, it should be understood that one or more of the features discussed in connection with FIG. 3 may be applied to this example.

Figure 7A:
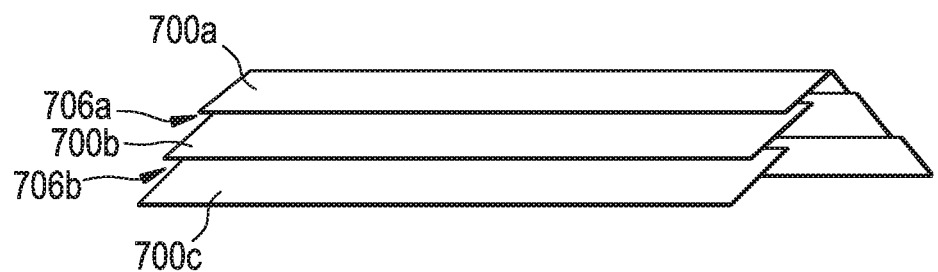
FIG. 7A is a perspective view of another deflector according to a non-limiting embodiment that may be used in the entrainment-reducing assembly of FIG. 2.
Figure 7B:
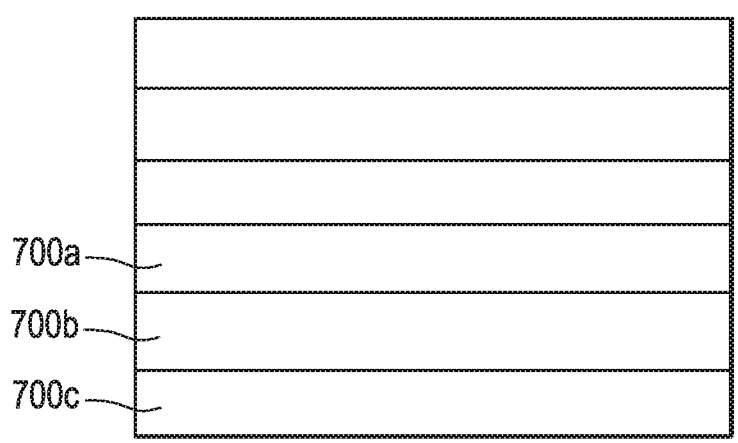
FIG. 7B is a plan view of the deflector of FIG. 7A.

FIG. 7A is a perspective view of another deflector according to a non-limiting embodiment that may be used in the entrainment-reducing assembly of FIG. 2. FIG. 7B is a plan view of the deflector of FIG. 7A. Referring to FIGS. 7A-7B, the deflector 210 is in the form of a linear-type louvered arrangement 210d including a first slat 700a, a second slat 700b, and a third slat 700c. When arranged in an overlapping louvered arrangement, the first slat 700a and the second slat 700b define a first slit 706a therebetween, while the second slat 700b and the third slat 700c define a second slit 706b therebetween. Although not shown, it should be understood that one or more of the features discussed in connection with FIG. 3 may be applied to this example.

Figure 8A:
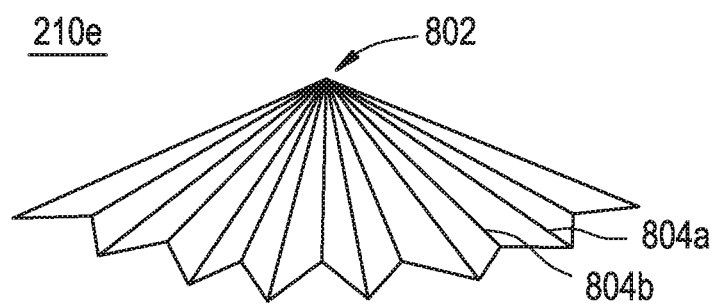
FIG. 8A is a perspective view of another deflector according to a non-limiting embodiment that may be used in the entrainment-reducing assembly of FIG. 2.
Figure 8B:
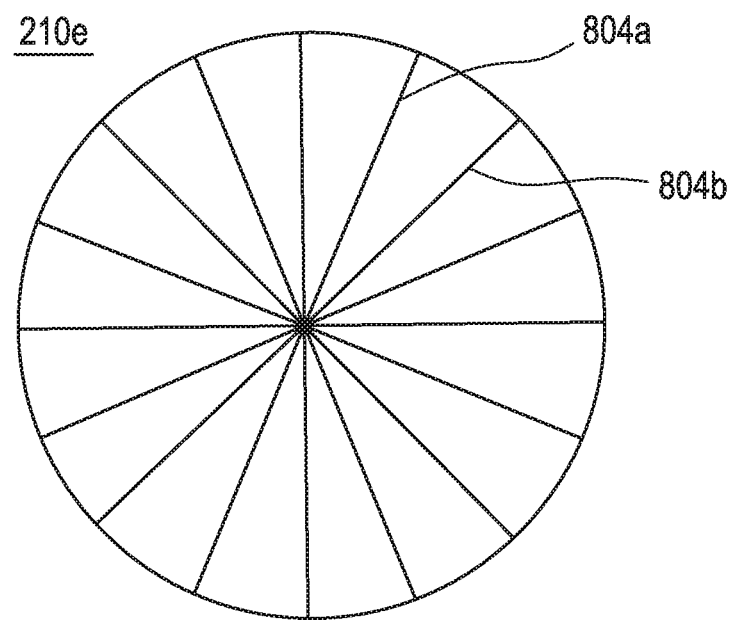
FIG. 8B is a plan view of the deflector of FIG. 8A.

FIG. 8A is a perspective view of another deflector according to a non-limiting embodiment that may be used in the entrainment-reducing assembly of FIG. 2. FIG. 8B is a plan view of the deflector of FIG. 8A. Referring to FIGS. 8A-8B, the deflector 210 is in the form of a radially-configured corrugated sheet 210e including a plurality of alternating radially-oriented ridges 804a and radially-oriented furrows 804b that expand outward radially from a point of common convergence 802. Although not shown, it should be understood that one or more of the features discussed in connection with FIG. 3 may be applied to this example.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A reactor system, comprising:
a first container defining a drywell therein;
a second container defining a wetwell therein, the second container including an upper portion and a lower portion;
a venting arrangement connecting the drywell to the wetwell, the venting arrangement including a proximal end extending into the drywell and a distal end extending into the upper portion of the wetwell;
a suction structure extending into the lower portion of the wetwell; and
a deflector disposed between the suction structure and the distal end of the venting arrangement within the second container, the deflector having a furrowed or concave side with perforations extending therethrough, the perforations being angled inward toward a furrow or concavity defined by the furrowed or concave side.

2. The reactor system of claim 1, wherein the second container is in a form of a torus.

3. The reactor system of claim 1, wherein the venting arrangement includes a vent pipe, a header connected to the vent pipe, and a downcomer connected to the header, the header and the downcomer being within the wetwell, the deflector being between the downcomer and the suction structure.

4. The reactor system of claim 1, wherein the deflector is secured to the second container such that the deflector does not directly contact the suction structure.

5. A method of reducing entrainment, comprising:
discharging gases from a first container to a second container using a venting arrangement such that the gases are discharged into a liquid, the first container defining a drywell therein, the second container defining a wetwell therein, the second container including an upper portion and a lower portion, the venting arrangement connecting the drywell to the wetwell, the venting arrangement including a proximal end extending into the drywell and a distal end extending into the upper portion of the wetwell;
alleviating an elevated level of the liquid resulting from condensing gases by performing an extraction of the liquid with a suction structure, the suction structure extending into the lower portion of the wetwell; and
shielding the suction structure from the entrainment of uncondensed gases in the liquid with a deflector during the extraction of the liquid, the deflector disposed between the suction structure and the distal end of the venting arrangement within the second container, the deflector having a furrowed or concave side with perforations extending therethrough, the perforations being angled inward toward a furrow or concavity defined by the furrowed or concave side.

6. The method of claim 5, wherein the shielding includes redirecting the uncondensed gases away from the suction structure with the deflector.

7. The method of claim 5, wherein the shielding includes providing the perforations such that the perforations extend through the deflector at an angle toward the suction structure such that a Froude number (Fr) is less than 0.31 to allow a flow of the liquid through the perforations while hindering a passage of the uncondensed gases through the perforations, $$Fr = V_L \Big/ \sqrt{g\left(\frac{(\rho_l - \rho_G)}{\rho_l}\right)D}$$

$V_L$ being a velocity of the liquid in the perforations, g being an acceleration due to gravity, $\rho_l$ being a density of the liquid, $\rho_G$ being a density of the gases, and D being a diameter of the perforations.

* * * * *